US011208051B2

(12) United States Patent
Yoon et al.

(10) Patent No.: US 11,208,051 B2
(45) Date of Patent: Dec. 28, 2021

(54) MULTI-PURPOSE CARRIER FOR VEHICLE

(71) Applicants: Il Shik Yoon, Seoul (KR); Jun Chan Yoon, Seoul (KR)

(72) Inventors: Il Shik Yoon, Seoul (KR); Jun Chan Yoon, Seoul (KR)

(*) Notice: Subject to any disclaimer, the term of this patent is extended or adjusted under 35 U.S.C. 154(b) by 37 days.

(21) Appl. No.: 15/777,366

(22) PCT Filed: Aug. 31, 2016

(86) PCT No.: PCT/KR2016/009681
§ 371 (c)(1),
(2) Date: May 18, 2018

(87) PCT Pub. No.: WO2017/086579
PCT Pub. Date: May 26, 2017

(65) Prior Publication Data
US 2021/0197729 A1    Jul. 1, 2021

(30) Foreign Application Priority Data
Nov. 19, 2015 (KR) .................. 10-2015-0162608

(51) Int. Cl.
*B60R 9/10* (2006.01)
*B60R 9/06* (2006.01)
*B60R 9/12* (2006.01)

(52) U.S. Cl.
CPC .................. *B60R 9/10* (2013.01); *B60R 9/06* (2013.01); *B60R 9/12* (2013.01)

(58) Field of Classification Search
CPC .... B60R 9/06; B60R 9/08; B60R 9/10; B60R 9/12; Y10S 224/924
(Continued)

(56) References Cited

U.S. PATENT DOCUMENTS 3,931,919 A * 1/1976 Gerber ...................... B60R 9/10
                                                                    224/324
5,628,440 A * 5/1997 Gallazzini ................. B60R 9/10
                                                                    224/329

(Continued)

FOREIGN PATENT DOCUMENTS

| DE | 3717986 A1 * | 12/1988 | ............... B60R 9/06 |
| EP | 0360706 A1 * | 3/1990 | ............... B60R 9/06 |
| FR | 2700738 A1 * | 7/1994 | ............... B60R 9/06 |

*Primary Examiner* — Scott T Mcnurlen
(74) *Attorney, Agent, or Firm* — R. John Bartz

(57) ABSTRACT

The present invention relates to a multi-purpose carrier for a vehicle which is configured to load a bicycle, skis, a snowboard, or other articles onto the vehicle and carry the bicycle, the skis, the snowboard, or the articles, the multi-purpose carrier including: a base support bar 10 disposed horizontally; one or two vertical supports 20; a horizontal support 30; an article mount 40; an angle fixing rod 50; an angle-fixing-rod support 55; two handle fixing rods 60; a bicycle frame fixing rod 70; clips 80; a stopper 90; and an article stand 92 which is structured to stop rotating by being caught by a horizontal rod of the stopper, in which a fixing strap is connected to the two clips 80 and other necessary portions, the fixing strap is fixed to the vehicle and securely tightened, a bicycle 100 is turned upside down, a bicycle frame 120 is fixed to the bicycle frame fixing rod 70, and two handles 110 of the bicycle are fixed to the two handle fixing rods 60, respectively, such that the bicycle is fixed to the vehicle, or the article is fixed to the article stand after the article stand 92 stands upright, such that the bicycle or the article may be carried by the vehicle.

6 Claims, 6 Drawing Sheets

(58) Field of Classification Search
USPC .......................................................... 224/924
See application file for complete search history.

(56) References Cited

U.S. PATENT DOCUMENTS

| | | | |
|---|---|---|---|
| 10,239,461 B1* | 3/2019 | Yoon | B60R 9/06 |
| 10,246,027 B2* | 4/2019 | Yoon | B60R 9/10 |
| 10,449,910 B2* | 10/2019 | Yoon | B60R 9/058 |
| 10,518,713 B1* | 12/2019 | Yoon | B60R 9/10 |
| 2012/0037678 A1* | 2/2012 | Hsu | B60R 9/10 |
| | | | 224/534 |
| 2016/0090017 A1* | 3/2016 | Aich | B60R 9/06 |
| | | | 700/218 |

\* cited by examiner

[Fig. 1]
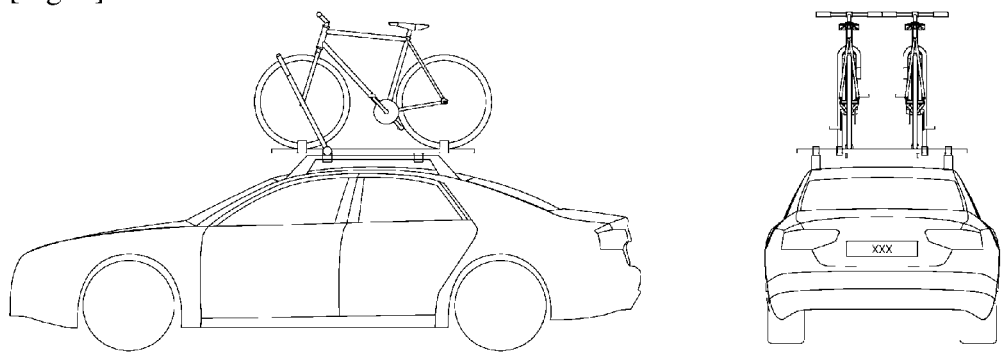
[Fig. 2]
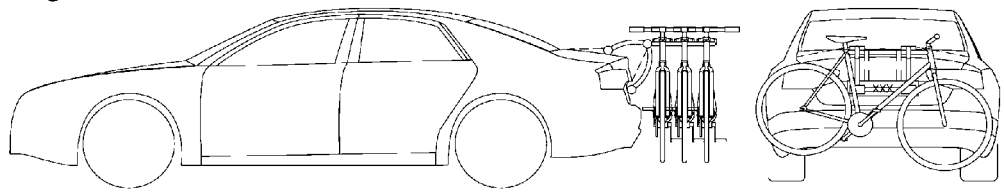
[Fig. 3]
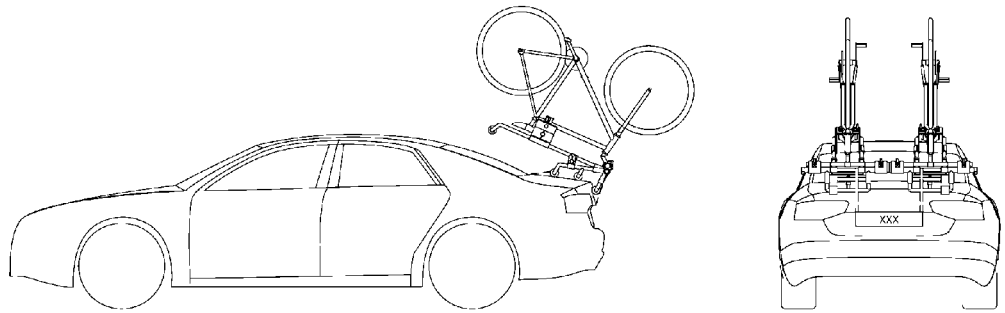
3A
3B

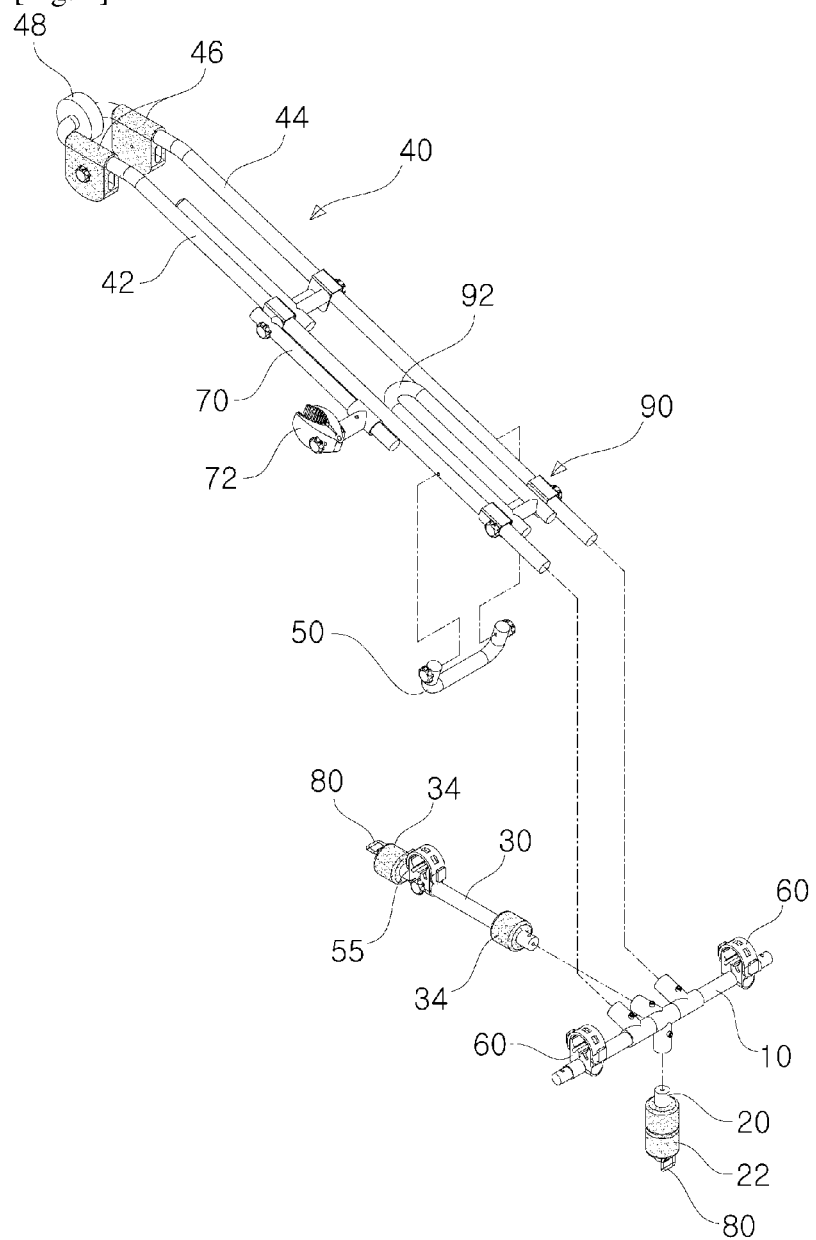

[Fig. 5]
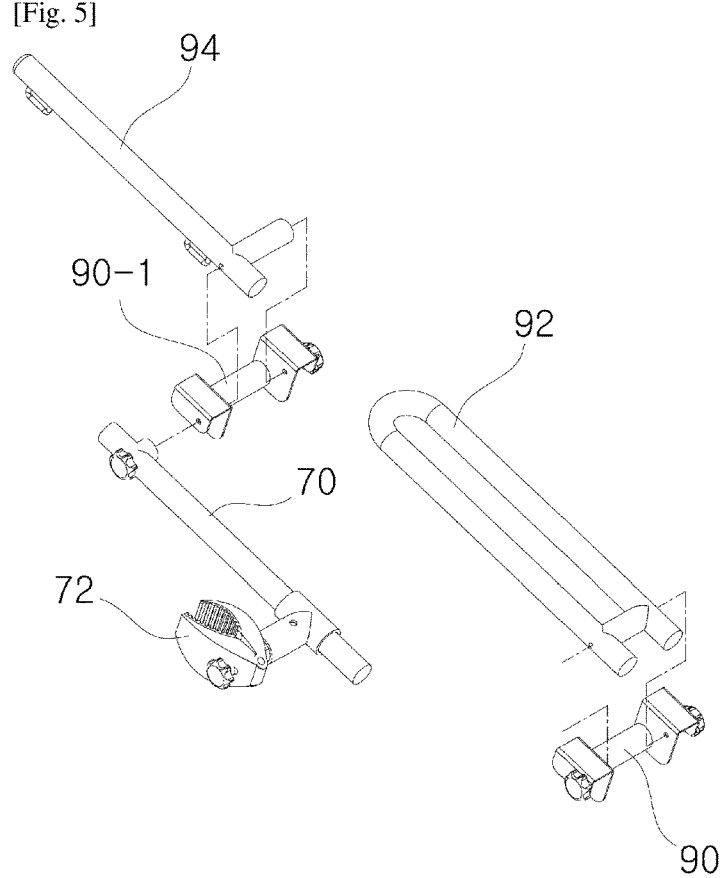
[Fig. 6]
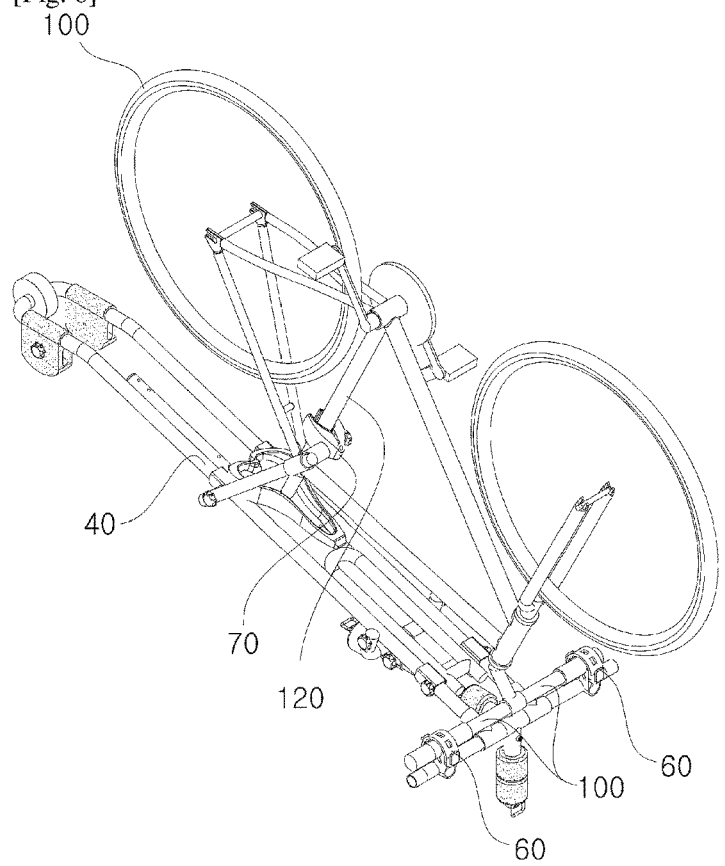

[Fig. 7]
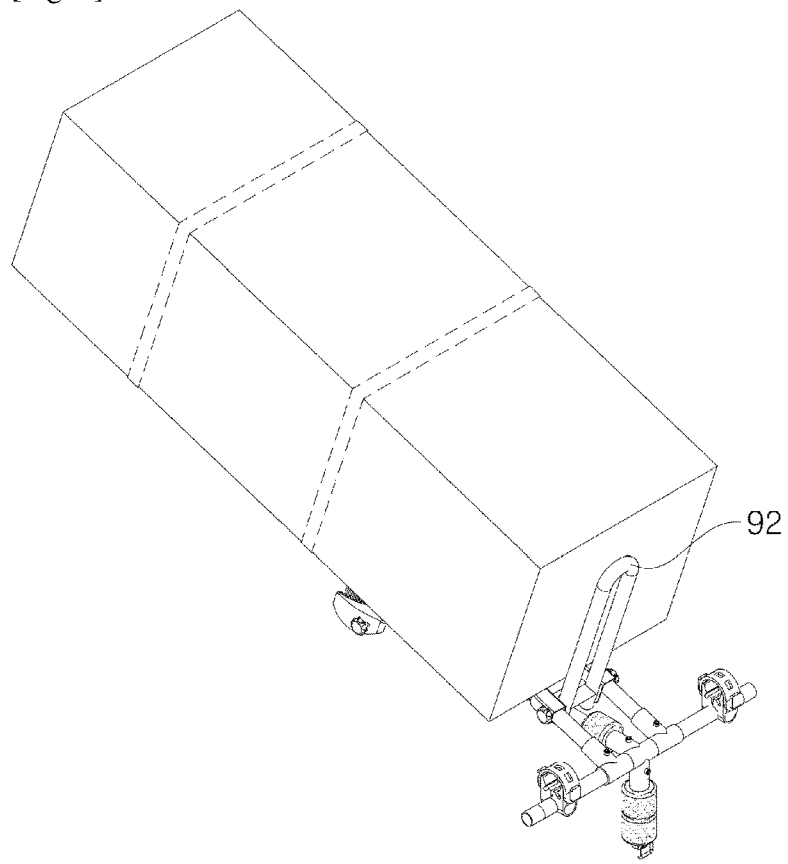
[Fig. 8]
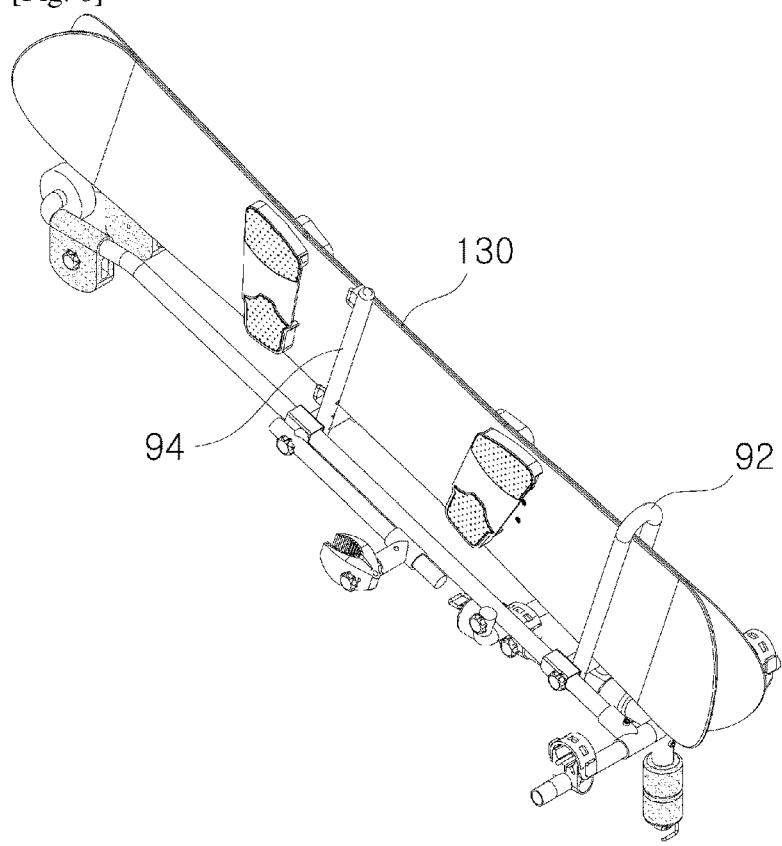

[Fig. 9]
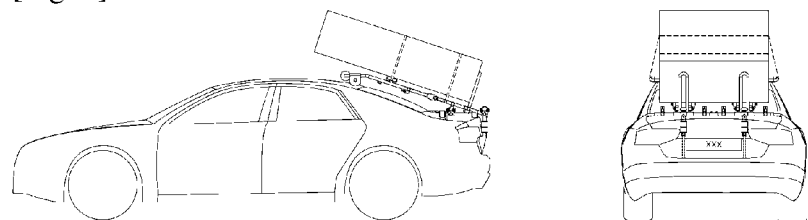
9A
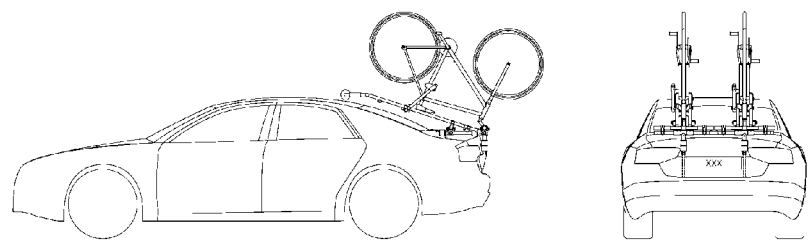
9B
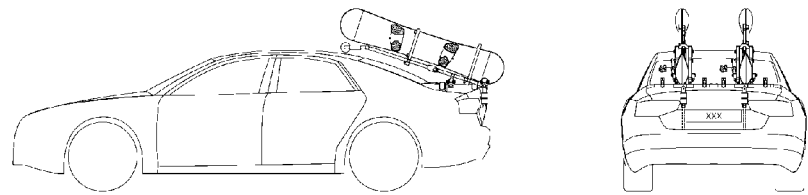
9C
[Fig. 10]
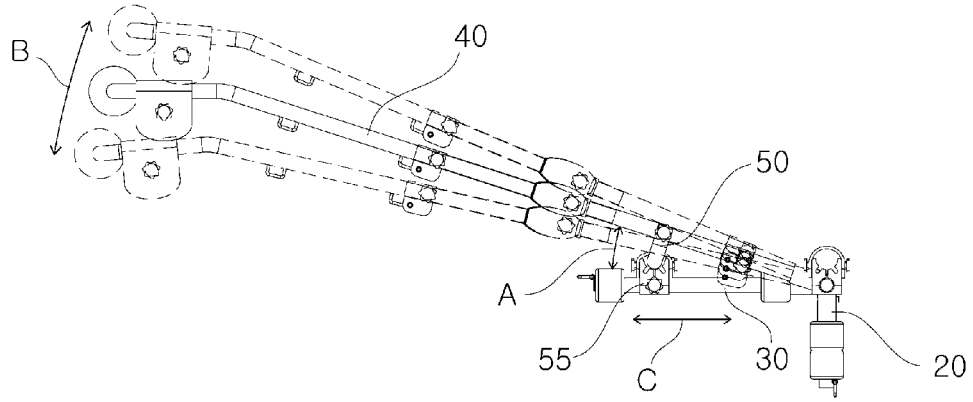

[Fig. 11]
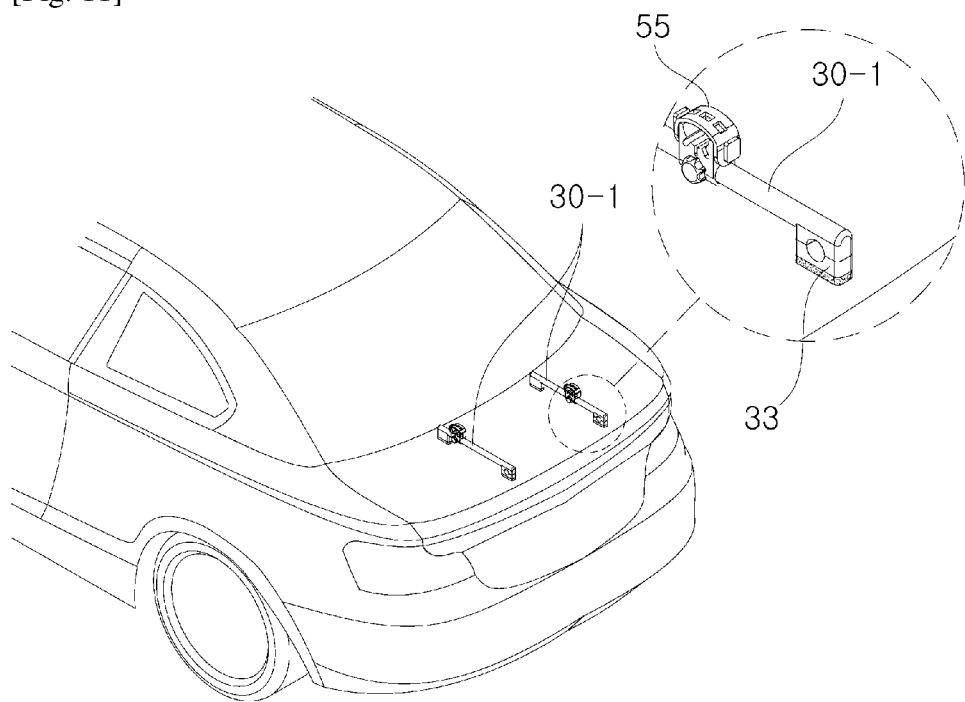
[Fig. 12]
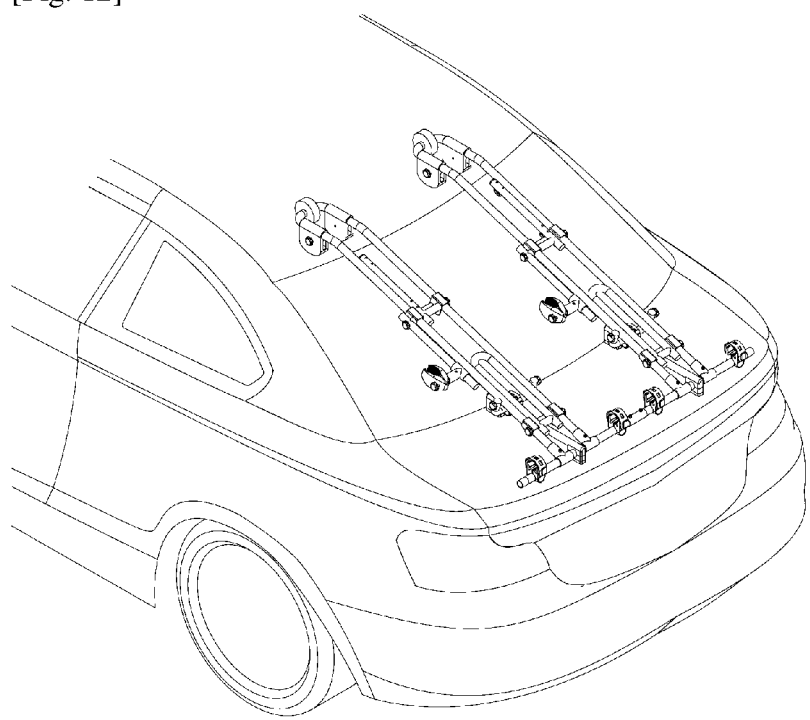

US 11,208,051 B2

MULTI-PURPOSE CARRIER FOR VEHICLE

TECHNICAL FIELD

The present invention relates to a multi-purpose carrier for a vehicle, and particularly, to a multi-purpose carrier for a vehicle configured to safely fix and carry a bicycle, skis, a snowboard, and other articles.

BACKGROUND ART

There are two types of bicycle carriers for a vehicle in the related art.

FIGS. 1 to 2 are side views and rear views illustrating bicycle carriers for a vehicle in the related art, in which FIG. 1 illustrates the bicycle carrier installed on a roof of the vehicle, and FIG. 2 illustrates the bicycle carrier installed at a rear side of the vehicle.

In a case in which the bicycle is supported on the roof of the vehicle as illustrated in FIG. 1, there are problems in that it is difficult to load the bicycle onto the vehicle, fuel economy of the vehicle deteriorates because of a large amount of air resistance applied to the vehicle while the vehicle travels, serious noise occurs due to the air resistance, a loaded state of the bicycle is unstable because a center of gravity of the bicycle is high, the bicycle is separated when the vehicle severely sways, and it is difficult for a driver to check a loaded state of the bicycle while the driver drives the vehicle.

In a case in which the bicycle is loaded onto a rear surface of the vehicle as illustrated in FIG. 2, there are problems in that there is concern that the vehicle will be damaged and fuel economy will deteriorate because a weight of the bicycle is concentrated at a rear side of the vehicle, safety driving deteriorates because the bicycle covers a number plate and tail lamps of the vehicle, it is impossible for a driver to check a loaded state of the bicycle while the driver drives the vehicle, and the bicycle and the vehicle are damaged because the bicycle comes into contact with the vehicle while the vehicle travels as well as while the bicycle is being installed at the rear of the vehicle.

FIG. 3 illustrates a bicycle carrier for a vehicle disclosed in Korean Patent No. 1550168 registered based on Korean Patent Application No. 2015-0004144 filed on Jan. 12, 2015 in the name of the present applicant, in which to solve the aforementioned problems, a bicycle is installed upside down at an upper side of a rear trunk of the vehicle, such that damage to a vehicle and a bicycle caused by contact between the vehicle and the bicycle is prevented by preventing the contact between the vehicle and the bicycle, fuel economy of the vehicle is ensured by maximally reducing air resistance caused by the bicycle, a driver may check a loaded state of the bicycle even while the driver drives the vehicle, and the bicycle is prevented from covering tail lamps and a number plate of the vehicle, but the bicycle carrier for a vehicle has problems in that a large amount of manufacturing costs is caused due to a complicated structure, and only the bicycle may be fixed.

DISCLOSURE

Technical Problem

The present invention has been conceived in consideration of the aforementioned problems of the bicycle carrier for a vehicle in the related art, and an object of the present invention is to provide a multi-purpose carrier for a vehicle which may allow a bicycle to be installed upside down at an upper side of a rear trunk of the vehicle, prevent damage to the vehicle and the bicycle caused by contact between the vehicle and the bicycle by preventing the contact between the vehicle and the bicycle, ensure fuel economy of the vehicle by maximally reducing air resistance caused by the bicycle, allow a driver to check a loaded state of the bicycle even while the driver drives the vehicle, prevent the bicycle from covering tail lamps and a number plate of the vehicle, reduce manufacturing costs because of a structure thereof is more simplified than a structure disclosed in Korean Patent No. 1550168 in the name of the present applicant, and load a snowboard and other articles other than the bicycle.

Technical Solution

To achieve the aforementioned object, the present invention provides a multi-purpose carrier for a vehicle which is configured to load and carry a bicycle, skis, a snowboard, or other articles, the multi-purpose carrier including: a base support bar 10 which is disposed horizontally; one or two vertical supports 20 which are rotatably connected to the base support bar 10 and supported on a rear surface of a trunk of the vehicle, and each have one end portion into which a buffer member 22 is fitted; a horizontal support 30 which is rotatably connected to the base support bar 10 so as to form a fixed angle with respect to the vertical support 20, is supported on an upper surface of the trunk of the vehicle, and has a portion which is in contact with the upper surface of the trunk and on which one or more buffer members 34 are mounted; an article mount 40 which is rotatably connected to the base support bar 10, has a rotary wheel 48 installed at one end portion of the article mount 40 opposite to the base support bar and supported at a rear glass of the vehicle, has a U shape entirely, has a greater length than the horizontal support 30, and supports the article; an angle fixing rod 50 which is positioned between the horizontal support 30 and the article mount 40 and rotatably connected to the article mount 40 to fix an angle between the horizontal support and the article mount; an angle-fixing-rod support 55 which is slidably installed on the horizontal support 30 and supports the angle fixing rod 50 to adjust an angle A between the horizontal support 30 and the article mount 40; two handle fixing rods 60 which are slidably installed at both sides of the base support bar 10 and fix both handles 110 of the bicycle; a bicycle frame fixing rod 70 which is slidably and rotatably installed on any one or both of two parallel support rods 42 and 44 that constitute the article mount 40, has a locking member 72 attached to one end portion of the bicycle frame fixing rod 70 to fix a bicycle frame, and fixes any one frame 120 of the bicycle; clips 80 which are installed at one end portion of the vertical support 20 and one end portion of the horizontal support 30, respectively, and into which a fixing strap is inserted; a stopper 90 which is slidably installed on the two support rods of the article mount 40 and has a horizontal rod that traverses the two support rods of the article mount; and an article stand 92 which is rotatably installed on the stopper 90, entirely has a U shape having a smaller length than the article mount, and is structured to stop rotating by being caught by the horizontal rod of the stopper, in which the fixing strap is connected to the two clips 80 and other necessary portions, the fixing strap is fixed to the vehicle and securely tightened, a bicycle 100 is turned upside down in a state in which a saddle of the bicycle is placed on the support rods 42 and 44, the bicycle frame 120 is fixed to the bicycle frame fixing rod 70, and the two handles 110 of the bicycle are fixed to the two handle fixing rods 60, respectively, so that the bicycle is fixed to the vehicle, or the article is fixed to the article stand after the article stand 92 stands upright, such that the bicycle or the article is carried by the vehicle.

The present invention also provides a multi-purpose carrier for a vehicle which is configured to load and carry a bicycle, skis, a snowboard, or other articles, the multi-purpose carrier including: a base support bar 10 which is disposed horizontally; a linear support 30-1 which is fixed at a right angle on the base support bar at an interval from a surface of a trunk of the vehicle; an article mount 40 which is rotatably connected to the base support bar 10, has a rotary wheel 48 installed at one end portion of the article mount 40 opposite to the base support bar and supported at a rear glass of the vehicle, has a U shape entirely, has a greater length than the linear support 30-1, and supports the article; an angle fixing rod 50 which is positioned between the linear support 30-1 and the article mount 40 and rotatably connected to the article mount 40 to fix an angle between the linear support and the article mount; an angle-fixing-rod support 55 which is slidably installed on the linear support 30-1 and supports the angle fixing rod 50 to adjust an angle A between the linear support 30-1 and the article mount 40; two handle fixing rods 60 which are slidably installed at both sides of the base support bar 10 and fix both handles 110 of the bicycle; a bicycle frame fixing rod 70 which is slidably and rotatably installed on any one or both of two parallel support rods 42 and 44 that constitute the article mount 40, has a locking member 72 attached to one end portion of the bicycle frame fixing rod 70 to fix a bicycle frame, and fixes any one frame 120 of the bicycle; a stopper 90 which is slidably installed on the two support rods of the article mount 40 and has a horizontal rod that traverses the two support rods of the article mount; and an article stand 92 which is rotatably installed on the stopper 90, entirely has a U shape having a smaller length than the article mount, and is structured to stop rotating by being caught by the horizontal rod of the stopper, in which a bicycle 100 is turned upside down in a state in which a saddle of the bicycle is placed on the support rods 42 and 44, the bicycle frame 120 is fixed to the bicycle frame fixing rod 70, and the two handles 110 of the bicycle are fixed to the two handle fixing rods 60, respectively, so that the bicycle is fixed to the vehicle, or the article is fixed to the article stand after the article stand 92 stands upright, such that the bicycle or the article is carried by the vehicle.

According to the present invention, a second stopper 90-1, which has the same structure and function as the stopper 90, may be installed on the article mount 40 at a predetermined interval from the stopper 90, the multi-purpose carrier may further include an L-shaped board stand 94 which is rotatably installed on the second stopper 90-1 and structured to stop rotating by being caught by a horizontal rod of the second stopper, and a snowboard may be fixed by making the snowboard stand, mounting the snowboard on the board stand 94, and inserting the snowboard into an internal space of the article stand 92 in a state in which the article stand 92 stands upright.

In addition, the carrier according to the present invention may further include support members 46 which are made of a buffer material, rotatably installed at end portions of the two frames 42 and 44 of the article mount 40, respectively, and vertically fixed as necessary when loading an article.

Advantageous Effect

According to the multi-purpose carrier for a vehicle according to the present invention, which is configured as described above, an article such as a bicycle may be easily installed at the upper side of the rear trunk of the vehicle, a driver may check a loaded state of the article even while the driver drives the vehicle, the multi-purpose carrier is helpful to safely drive because the multi-purpose carrier does not cover tail lamps and a number plate of the vehicle, the trunk of the vehicle may be freely opened or closed even in a state in which the article is loaded, such that convenience for a driver does not deteriorate, and the structure of the multi-purpose carrier is more simplified in comparison with a carrier in the related art, such that the multi-purpose carrier is more conveniently manufactured and installed.

In addition, a robbery of the carrier may be prevented because the carrier is fixed to the vehicle.

DESCRIPTION OF DRAWINGS

FIGS. 1 to 2 are views illustrating bicycle carriers for a vehicle in the related art, in which FIG. 1 is a side view and a rear view illustrating the bicycle carrier installed on a roof of the vehicle, and FIG. 2 is a side view and a rear view illustrating the bicycle carrier installed at a rear side of the vehicle.

FIGS. 3A and 3B are a side view and a rear view of a vehicle illustrating a state in which bicycles are loaded onto a bicycle carrier for a vehicle in the related art made by the present applicant.

FIG. 4 is an exploded perspective view of a multi-purpose carrier for a vehicle according to the present invention.

FIG. 5 is an exploded perspective view of a main part in FIG. 3.

FIG. 6 is a perspective view illustrating a state in which a bicycle is installed on the multi-purpose carrier according to the present invention.

FIG. 7 is a perspective view illustrating a state in which a general article is loaded and fixed onto the multi-purpose carrier according to the present invention.

FIG. 8 is a perspective view illustrating an exemplary embodiment in which a snowboard is fixed.

FIGS. 9A to 9C are side views and rear views illustrating states in which the two multi-purpose carriers according to the present invention are installed on the vehicle to carry a general article, bicycles, and snowboards.

FIG. 10 is a side view illustrating an example in which an angle of an article mount is adjusted by using an angle fixing rod and a support.

FIG. 11 is a perspective view illustrating another exemplary embodiment of the present invention and an enlarged view of part D.

FIG. 12 is a perspective view illustrating a state in which the two carriers illustrated in FIG. 11 are installed in parallel.

BEST MODE

FIG. 4 is an exploded perspective view of a multi-purpose carrier for a vehicle according to the present invention, and FIG. 5 is an exploded perspective view of a main part in FIG. 3.

As illustrated, the multi-purpose carrier according to the present invention is configured to load a bicycle, skis, a snowboard, or other articles onto a vehicle and carry the bicycle, the skis, the snowboard, or the articles, and includes a base support bar 10, as a main component, which is disposed horizontally. A vertical support 20, which is in the form of a straight bar, is slidably and rotatably connected to the base support bar 10. Specifically, as illustrated in the drawings, a bracket, which has a female coupling structure, is installed on the base support bar 10, and the vertical support 20 may be coupled just by being inserted into the bracket. The vertical support 20 is supported on a rear surface of a trunk of the vehicle in a state in which the vertical support 20 is installed, and in this case, a buffer member 22 having an impact absorbing function or elasticity may be fitted at one end portion of the vertical support 20 in order to prevent damage to a surface of the vehicle. One or two vertical supports 20 may be installed in accordance with an installation aspect. For example, the two vertical supports 20 may be used to ensure stability when only one carrier is used, but only one vertical support 20 may be used when several carriers are disposed and used in parallel. These configurations will be described in detail below.

A horizontal support 30, which is in the form of a straight bar, is coupled to the base support bar 10, specifically, to the aforementioned bracket to have a predetermined fixed angle with respect to the vertical support 20. The horizontal support 30 may be rotated while having a predetermined angle with respect to the vertical support 20, and since the horizontal support 30 is supported on an upper surface of the trunk of the vehicle in the state in which the horizontal support 30 is installed, one or more buffer members 34 may be fitted at a portion, which is in contact with the surface of the vehicle, in order to prevent damage to the upper surface of the trunk.

In addition, an article mount 40, which is elongated and entirely has a U shape, is rotatably coupled to the base support bar 10, specifically, to the aforementioned bracket. A rotary wheel 48, which is made of a buffer material, is installed at one end portion of the article mount 40 which is opposite to the base support bar 10. A length of the article mount 40 needs to be greater than a length of the horizontal support 30. As described below in detail, the article mount 40 serves to support a bicycle, a snowboard, or other articles.

An angle fixing rod 50 is positioned between the horizontal support 30 and the article mount 40 and rotatably connected to the article mount 40, the angle fixing rod 50 has a U shape and is rotatably connected to both support rods 42 and 44 of the article mount 40, and as described below, and the angle fixing rod 50 is configured to adjust and fix an angle between the horizontal support and the article mount as described below.

An angle-fixing-rod support 55 is slidably installed on the horizontal support 30. As described below, the angle-fixing-rod support 55 has a concave groove, and an angle of the article mount 40 may be adjusted to a desired angle by moving the angle-fixing-rod support 55 along the horizontal support 30 in a state in which the angle fixing rod 50 engages with the groove.

Two handle fixing rods 60 are slidably installed at both sides of the base support bar 10, and both handles 110 of a bicycle may be fixed to the handle fixing rods 60. The handle fixing rod 60 may have any structure as long as the handle of the bicycle may be fastened and fixed to the handle fixing rod 60.

A bicycle frame fixing rod 70 is slidably and rotatably installed on any one or both of the two parallel support rods 42 and 44 which constitute the article mount 40, and a locking member 72, which is in the form of a pincher for fixing a bicycle frame, is attached to one end portion of the bicycle frame fixing rod 70. The locking member 72 may have other structures other than the pincher structure as long as the locking member 72 may securely fasten the bicycle frame. In addition, clips 80, into which a fixing strap for securely binding and fixing a bicycle or other articles may be inserted, may be installed at one end portion of the vertical support 20 and one end portion of the horizontal support 30, respectively.

A stopper 90 is slidably installed on the two support rods of the article mount 40. As concretely illustrated in FIG. 5, the stopper 90 has a horizontal rod that traverses the two support rods of the article mount. The stopper 90 may be moved along the article mount 40 and may be fixed by using screws or the like installed at both sides of the stopper 90. An article stand 92 is rotatably installed on the stopper 90. The article stand 92 entirely has a U shape having a smaller length than the article mount, and the article stand 92 is structured to stop rotating by being caught by the horizontal rod of the stopper 90 in a state in which the article stand is rotated, specifically, in a state in which the article stand stands upright.

A usage example of the multi-purpose carrier configured as described above will be described.

FIG. 6 is a perspective view illustrating a state in which a bicycle is installed on the multi-purpose carrier according to the present invention. As illustrated, it is possible to fix a bicycle 100 to the carrier by turning a bicycle 100 upside down, fixing a bicycle frame 120 by using the bicycle frame fixing rod 70, and fixing the two handles 110 of the bicycle to the two handle fixing rods 60.

FIG. 7 is a perspective view illustrating a state in which a general article is loaded and fixed onto the multi-purpose carrier according to the present invention. As illustrated, in this case, the article stand 92 stands upright, and the article is fixed to the article stand. The article may be securely fixed to the carrier by using several straps, as necessary.

Meanwhile, referring to FIGS. 4 and 5, a second stopper 90-1, which has the same structure and function as the stopper 90, may be installed on the article mount 40 at a predetermined interval from the stopper 90, and an L-shaped board stand 94 may be rotatably installed on the second stopper 90-1. The board stand 94 is structured to stop rotating by being caught by a horizontal rod of the second stopper, and this exemplary embodiment is for installing a snowboard.

FIG. 8 is a perspective view illustrating an exemplary embodiment in which a snowboard is fixed. In this case, it is possible to fix the snowboard by making the board stand 94 stand at a right angle, making the snowboard 130 stand, mounting the snowboard 130 on the board stand 94, and inserting the snowboard into an internal space of the article stand 92 in a state in which the article stand 92 stands upright, and as illustrated, the two snowboards may be inserted. Of course, skis may be carried instead of the snowboard or together with the snowboard.

Referring back to FIGS. 4 and 5, support members 46 made of a buffer material may be rotatably installed at end portions of the two frames 42 and 44 of the article mount 40. A means for supporting a load may be further needed when a very heavy article is loaded, and to this end, the support member 46 is provided, and the support member 46 is usually folded horizontally and may be fixed vertically as necessary. The two support members 46 in a vertical state may be supported on the surface of the vehicle to support a heavy article.

The multi-purpose carrier according to the present invention, which is configured as described above, may be used alone, but two or more multi-purpose carriers may be installed in parallel to carry multiple articles or a heavy article. FIG. 9 illustrates this exemplary embodiment.

FIGS. 9A to 9C are side views and rear views illustrating states in which the two multi-purpose carriers according to the present invention are installed on the vehicle to carry a general article (FIG. 9A), bicycles (FIG. 9B), and snowboards (FIG. 9C).

As illustrated, a heavy article, two bicycles, or two pairs of snowboards may be easily carried in the state in which the two carriers are installed in parallel.

As necessary, a horizontal stand for further supporting a heavy article may be further installed to traverse the two carriers in order to support the heavy article, but a detailed description thereof will be omitted.

FIG. 10 is a side view of an example of adjusting an angle of the article mount 40 by using the angle fixing rod 50 and the support 55.

FIG. 11 is a perspective view illustrating another exemplary embodiment of the present invention and an enlarged view of part D.

This exemplary embodiment differs from the aforementioned exemplary embodiment in that the vertical support 20 is not used, and two linear supports 30-1 are fixed to an upper surface of the trunk instead of the horizontal support 30, but the remaining structures thereof are identical to one another. That is, the linear support 30-1 is fixed to the base support bar at a right angle with respect to the base support bar at an interval from the surface of the trunk of the vehicle. The aforementioned angle-fixing-rod support 55 is slidably fixed to the linear support 30-1. The base support bar 10 is inserted and fixed into a hole formed in a fixing means 33 for fixing the linear support 30-1 to the surface of the trunk. This exemplary embodiment does not require the vertical support 20 in the aforementioned exemplary embodiment and a separate fixing strap for fixing the carrier, and this exemplary embodiment is advantageous in that stability is greater because the base support bar is securely fixed to the surface of the vehicle.

FIG. 12 is a perspective view illustrating a state in which the two carriers having the structure are installed in parallel, and a method of loading a bicycle, a snowboard, or other articles onto the carrier is the same as the method described in the aforementioned exemplary embodiment. In the exemplary embodiment having the aforementioned structure, it is also possible to prevent a robbery of the carrier since the linear supports 30-1 are coupled to the vehicle.

The invention claimed is:

1. A multi-purpose carrier for a vehicle which is configured to load a bicycle, skis, a snowboard, or other articles onto the vehicle and carry the bicycle, the skis, the snowboard, or the articles, the multi-purpose carrier comprising:
   a base support bar 10 which is disposed horizontally;
   one or two vertical supports 20 which are rotatably connected to the base support bar 10 and supported on a rear surface of a trunk of the vehicle, and each have one end portion into which a buffer member 22 is fitted;
   a horizontal support 30 which is rotatably connected to the base support bar 10 so as to form a fixed angle with respect to the vertical support 20, is supported on an upper surface of the trunk of the vehicle, and has a portion which is in contact with the upper surface of the trunk and on which one or more buffer members 34 are mounted;
   an article mount 40 which is rotatably connected to the base support bar 10, has a rotary wheel 48 installed at one end portion of the article mount 40 opposite to the base support bar and supported at a rear glass of the vehicle, has a U shape entirely, has a greater length than the horizontal support 30, and supports the article;
   an angle fixing rod 50 which is positioned between the horizontal support 30 and the article mount 40 and rotatably connected to the article mount 40 to fix an angle between the horizontal support and the article mount;
   an angle-fixing-rod support 55 which is slidably installed on the horizontal support 30 and supports the angle fixing rod 50 to adjust an angle A between the horizontal support 30 and the article mount 40;
   two handle fixing rods 60 which are slidably installed at both sides of the base support bar 10 and fix both handles 110 of the bicycle;
   a bicycle frame fixing rod 70 which is slidably and rotatably installed on any one or both of two parallel support rods 42 and 44 that constitute the article mount 40, has a locking member 72 attached to one end portion of the bicycle frame fixing rod 70 to fix a bicycle frame, and fixes any one frame 120 of the bicycle;
   clips 80 which are installed at one end portion of the vertical support 20 and one end portion of the horizontal support 30, respectively, and into which a fixing strap is inserted;
   a stopper 90 which is slidably installed on the two support rods of the article mount 40 and has a horizontal rod that traverses the two support rods of the article mount; and
   an article stand 92 which is rotatably installed on the stopper 90, entirely has a U shape having a smaller length than the article mount, and is structured to stop rotating by being caught by the horizontal rod of the stopper,
   wherein the fixing strap is connected to the two clips 80, the fixing strap is fixed to the vehicle and securely tightened, a bicycle 100 is turned upside down in a state in which a saddle of the bicycle is placed on the support rods 42 and 44, the bicycle frame 120 is fixed to the bicycle frame fixing rod 70, and the two handles 110 of the bicycle are fixed to the two handle fixing rods 60, respectively, so that the bicycle is fixed to the vehicle, or the article is fixed to the article stand after the article stand 92 stands upright, such that the bicycle or the article is carried by the vehicle.

2. The multi-purpose carrier of claim 1, wherein a second stopper 90-1, which has the same structure and function as the stopper 90, is installed on the article mount 40 at a predetermined interval from the stopper 90, the multi-purpose carrier further includes an L-shaped board stand 94 which is rotatably installed on the second stopper 90-1 and structured to stop rotating by being caught by a horizontal rod of the second stopper, and a snowboard is fixed by rotating the board stand, mounting the snowboard on the board stand 94, and inserting the snowboard into an internal space of the article stand 92 in a state in which the article stand 92 stands upright.

3. The multi-purpose carrier of claim 1, further comprising:
   support members 46 which are made of a buffer material, rotatably installed at end portions of the two frames 42 and 44 of the article mount 40, respectively, and vertically fixed as necessary when loading an article.

4. A multi-purpose carrier for a vehicle which is configured to load and carry a bicycle, skis, a snowboard, or other articles, the multi-purpose carrier comprising:
   a base support bar 10 which is disposed horizontally;
   a linear support 30-1 which is fixed at a right angle on the base support bar at an interval from a surface of a trunk of the vehicle;

an article mount 40 which is rotatably connected to the base support bar 10, has a rotary wheel 48 installed at one end portion of the article mount 40 opposite to the base support bar and supported at a rear glass of the vehicle, has a U shape entirely, has a greater length than the linear support 30-1, and supports the article;

an angle fixing rod 50 which is positioned between the linear support 30-1 and the article mount 40 and rotatably connected to the article mount 40 to fix an angle between the linear support and the article mount;

an angle-fixing-rod support 55 which is slidably installed on the linear support 30-1 and supports the angle fixing rod 50 to adjust an angle A between the linear support 30-1 and the article mount 40;

two handle fixing rods 60 which are slidably installed at both sides of the base support bar 10 and fix both handles 110 of the bicycle;

a bicycle frame fixing rod 70 which is slidably and rotatably installed on any one or both of two parallel support rods 42 and 44 that constitute the article mount 40, has a locking member 72 attached to one end portion of the bicycle frame fixing rod 70 to fix a bicycle frame, and fixes any one frame 120 of the bicycle;

a stopper 90 which is slidably installed on the two support rods of the article mount 40 and has a horizontal rod that traverses the two support rods of the article mount; and an article stand 92 which is rotatably installed on the stopper 90, entirely has a U shape having a smaller length than the article mount, and is structured to stop rotating by being caught by the horizontal rod of the stopper, wherein a bicycle 100 is turned upside down in a state in which a saddle of the bicycle is placed on the support rods 42 and 44, the bicycle frame 120 is fixed to the bicycle frame fixing rod 70, and the two handles 110 of the bicycle are fixed to the two handle fixing rods 60, respectively, so that the bicycle is fixed to the vehicle, or the article is fixed to the article stand after the article stand 92 stands upright, such that the bicycle or the article is carried by the vehicle.

5. The multi-purpose carrier of claim 4, wherein a second stopper 90-1, which has the same structure and function as the stopper 90, is installed on the article mount 40 at a predetermined interval from the stopper 90, the multi-purpose carrier further includes an L-shaped board stand 94 which is rotatably installed on the second stopper 90-1 and structured to stop rotating by being caught by a horizontal rod of the second stopper, and a snowboard is fixed by rotating the board stand, mounting the snowboard on the board stand 94, and inserting the snowboard into an internal space of the article stand 92 in a state in which the article stand 92 stands upright.

6. The multi-purpose carrier of claim 4, further comprising:

support members 46 which are made of a buffer material, rotatably installed at end portions of the two frames 42 and 44 of the article mount 40, respectively, and vertically fixed as necessary when loading an article.

* * * * *